(12) United States Patent
Takada et al.

(10) Patent No.: US 10,122,136 B1
(45) Date of Patent: Nov. 6, 2018

(54) BUS BAR AND CONNECTION MODULE PROVIDED WITH THE BUS BAR

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Kotaro Takada, Mie (JP); Osamu Nakayama, Mie (JP); Mitsutoshi Morita, Mie (JP); Koichiro Mochizuki, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 16/002,166

(22) Filed: Jun. 7, 2018

(30) Foreign Application Priority Data

Jun. 16, 2017 (JP) ................. 2017-118518

(51) Int. Cl.
*H01R 4/60* (2006.01)
*H01R 25/16* (2006.01)

(52) U.S. Cl.
CPC ......... *H01R 25/161* (2013.01); *H01R 25/165* (2013.01)

(58) Field of Classification Search
CPC .... H01R 25/16; H01R 25/161; H01R 25/162; H01R 25/165

USPC .................................... 439/212, 213
See application file for complete search history.

(56) References Cited

U.S. PATENT DOCUMENTS

| | | | | |
|---|---|---|---|---|
| 4,376,561 A | * | 3/1983 | Vanden Hoek | E04B 2/7427 439/210 |
| 4,875,871 A | * | 10/1989 | Booty, Sr. | H01R 25/162 439/209 |
| 5,507,668 A | * | 4/1996 | Lambrinos | H01R 25/161 439/502 |
| 2018/0170189 A1 | * | 6/2018 | Ulrich | B60L 5/38 |

FOREIGN PATENT DOCUMENTS

JP 2013143181 A 7/2013

* cited by examiner

*Primary Examiner* — Khiem Nguyen
(74) *Attorney, Agent, or Firm* — Reising Ethington, P.C.

(57) ABSTRACT

A bus bar that requires less installation space, and can reliably position and hold an electric wire. An electrical wire is to be connected to a bus bar, and the bus bar is to be joined to an electrode terminal of an electricity storage element. The bus bar includes: an electrical wire connection portion that is constituted by a member included in the bus bar, is provided in an end portion of the bus bar, and to which an end portion of the electrical wire is to be connected. The electrical wire connection portion includes a core wire connection portion to which a core wire of the electrical wire is to be connected; and a positioning and holding portion that is configured to position the electrical wire in a direction (a direction indicated by an arrow Z) that is orthogonal to an axial direction of the electrical wire in plan view, and to hold the electrical wire.

9 Claims, 13 Drawing Sheets

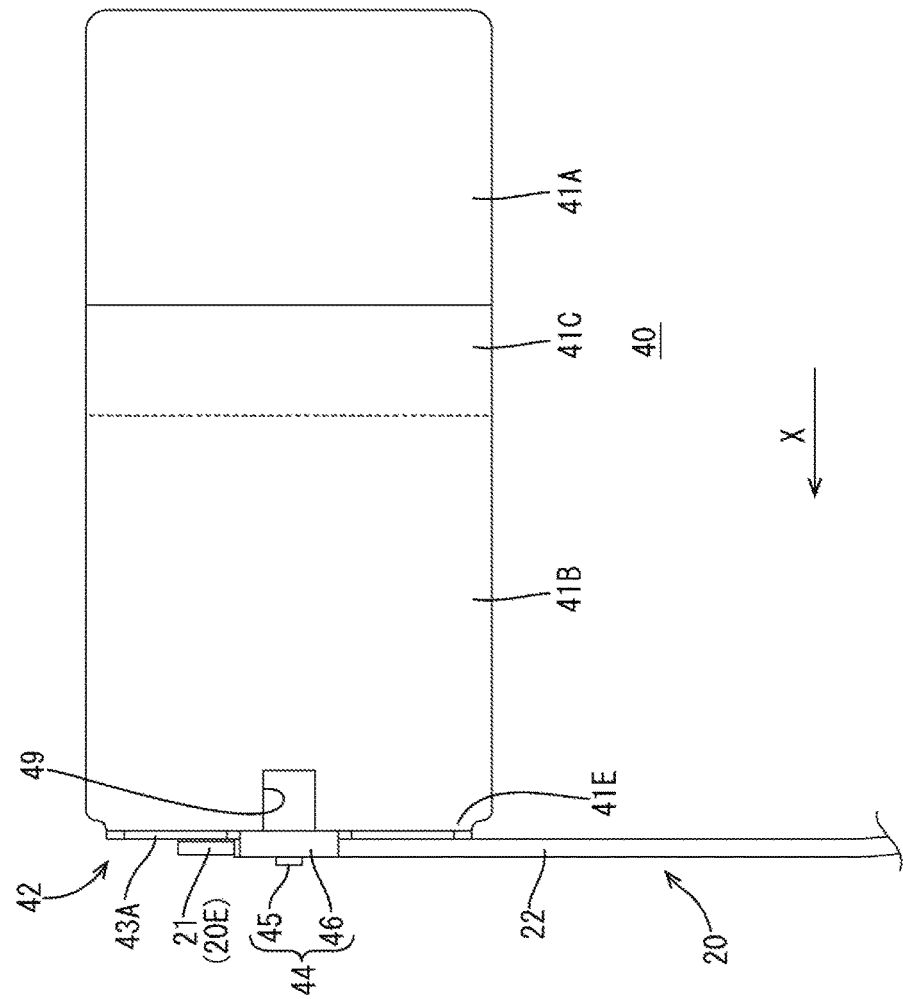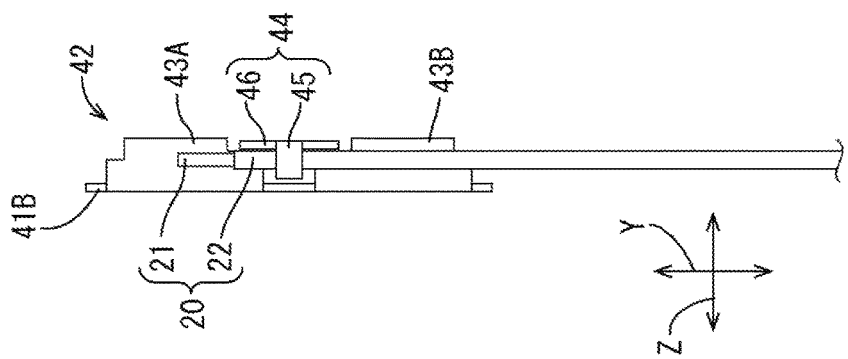

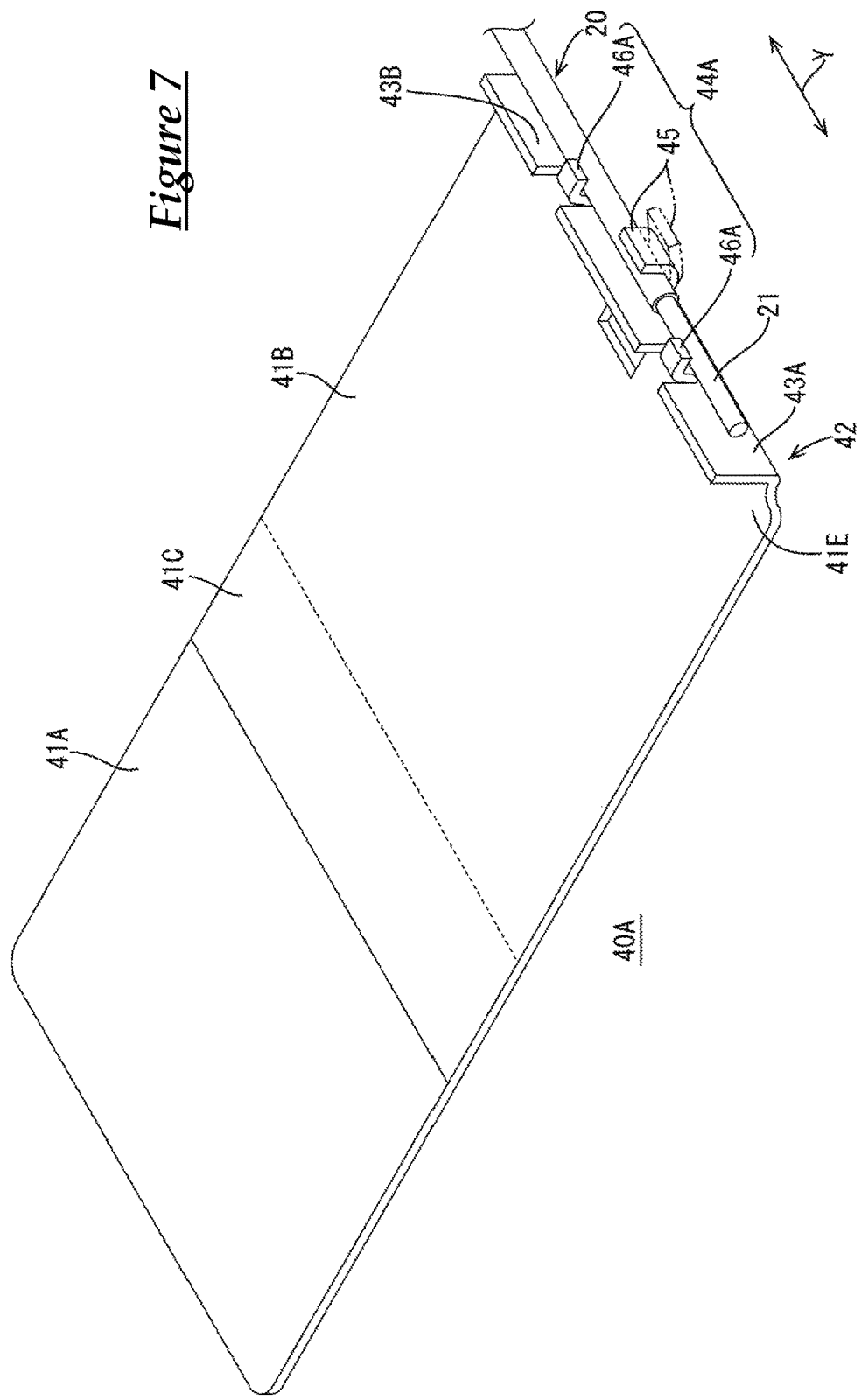

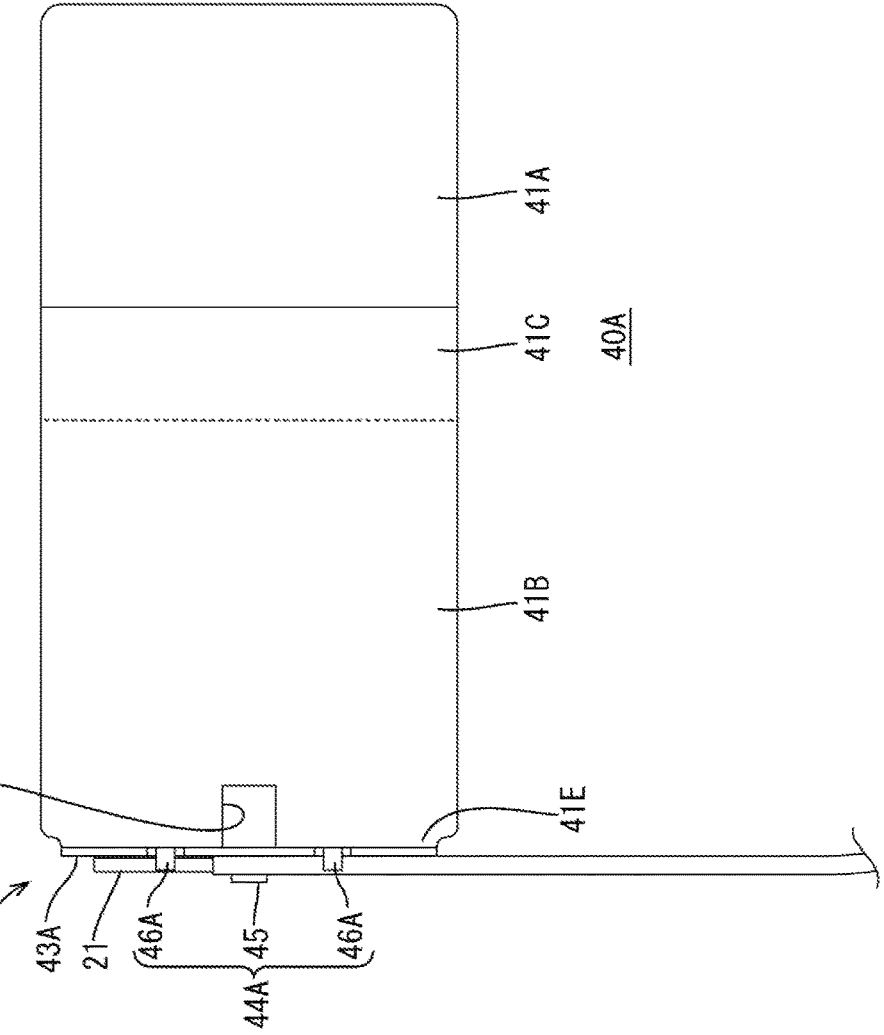
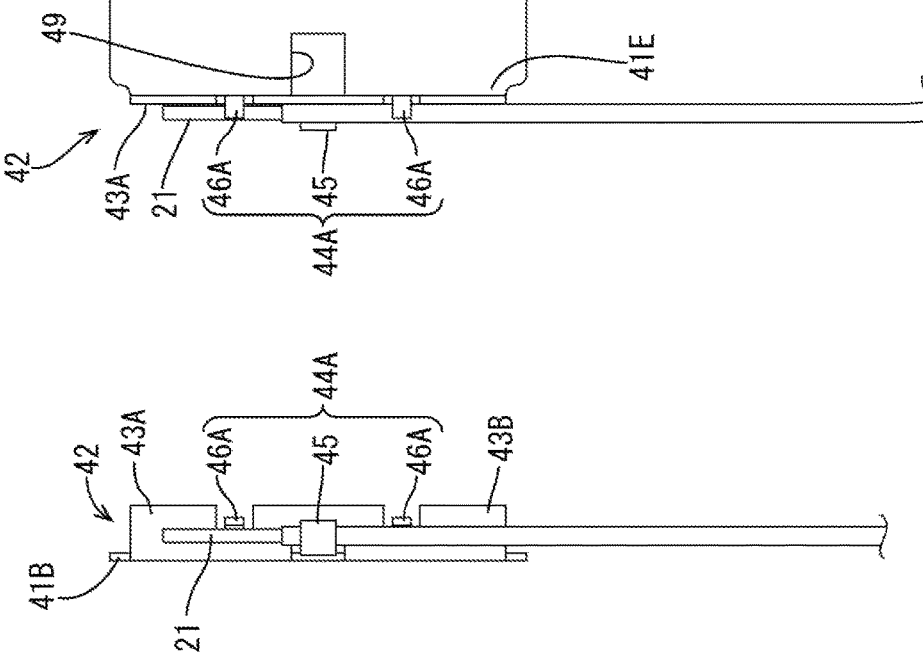

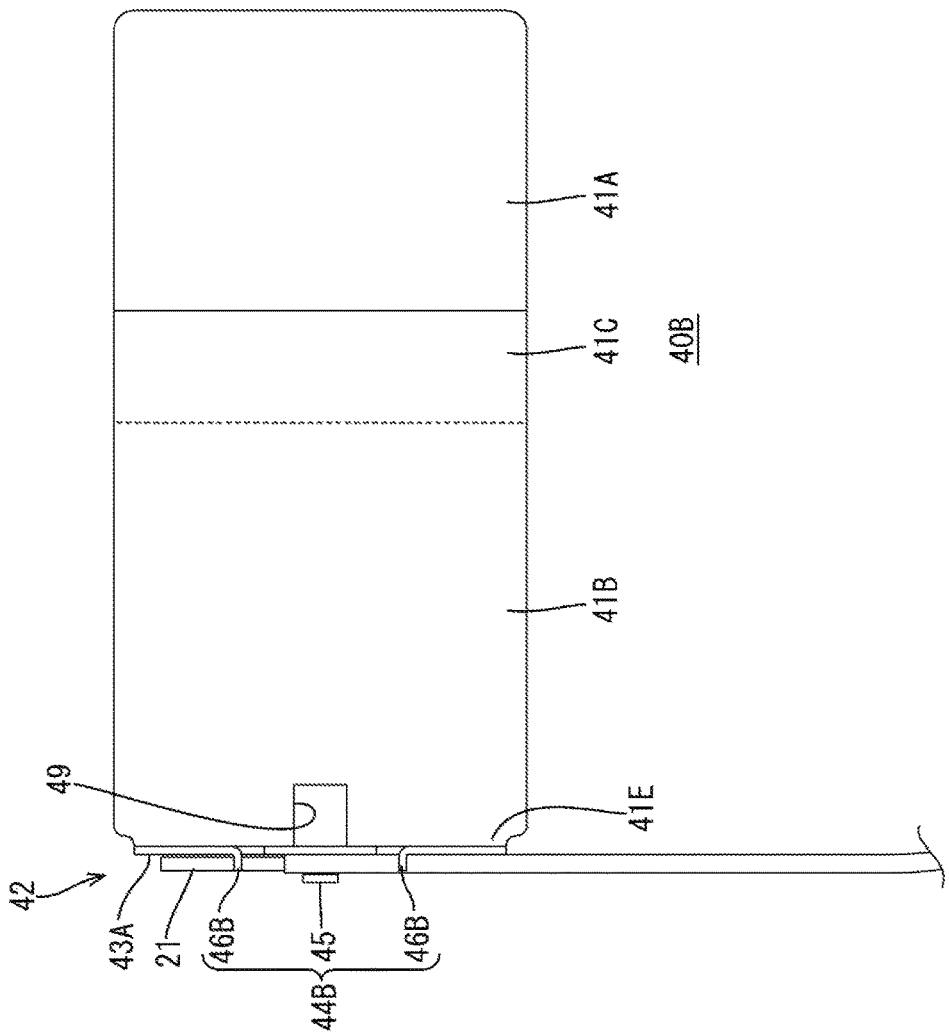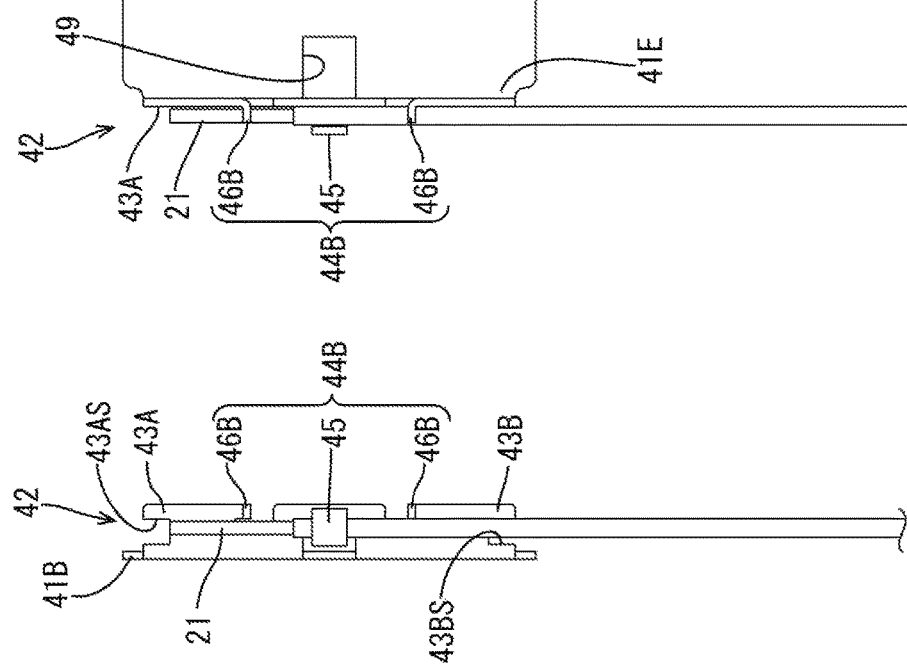

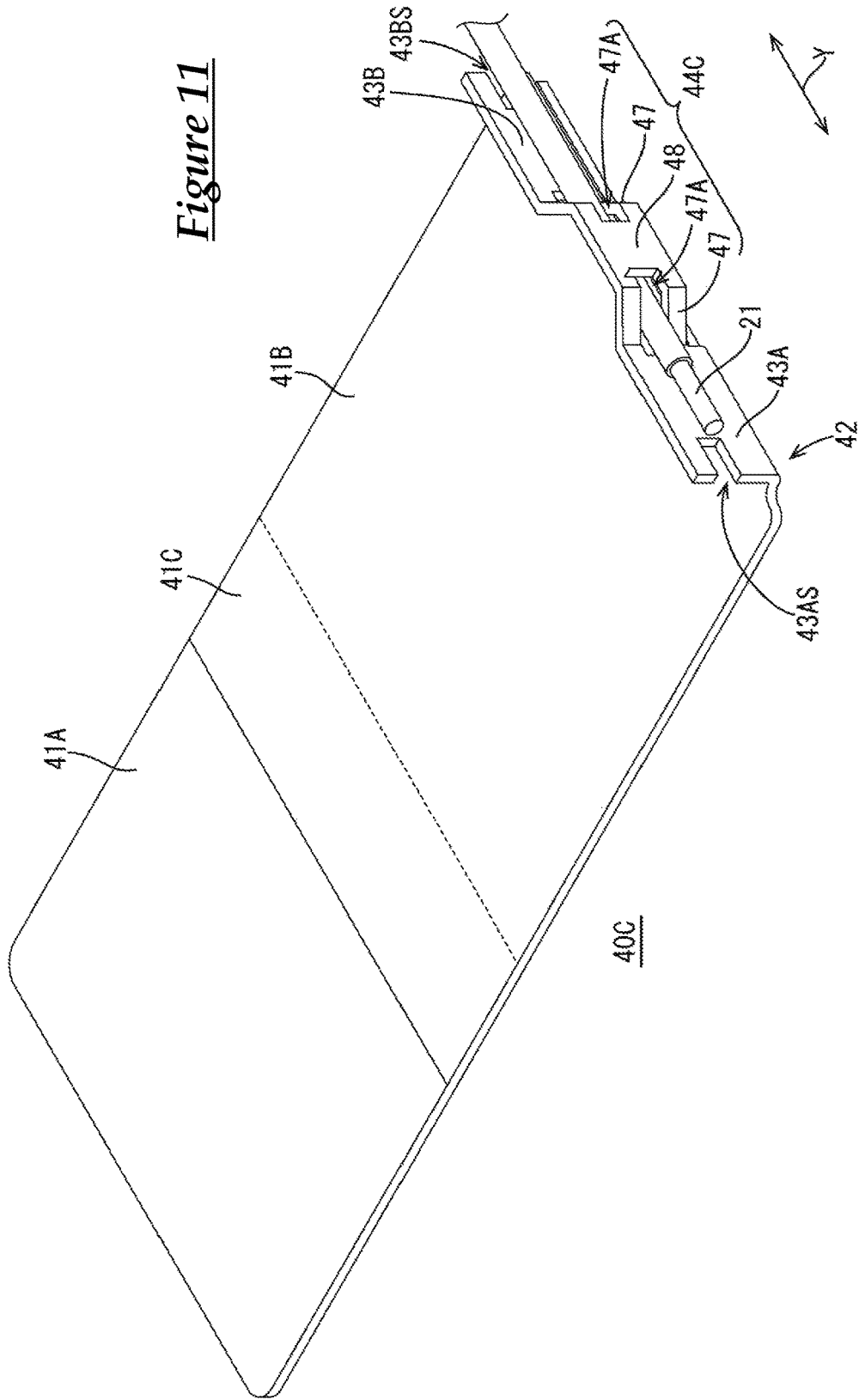

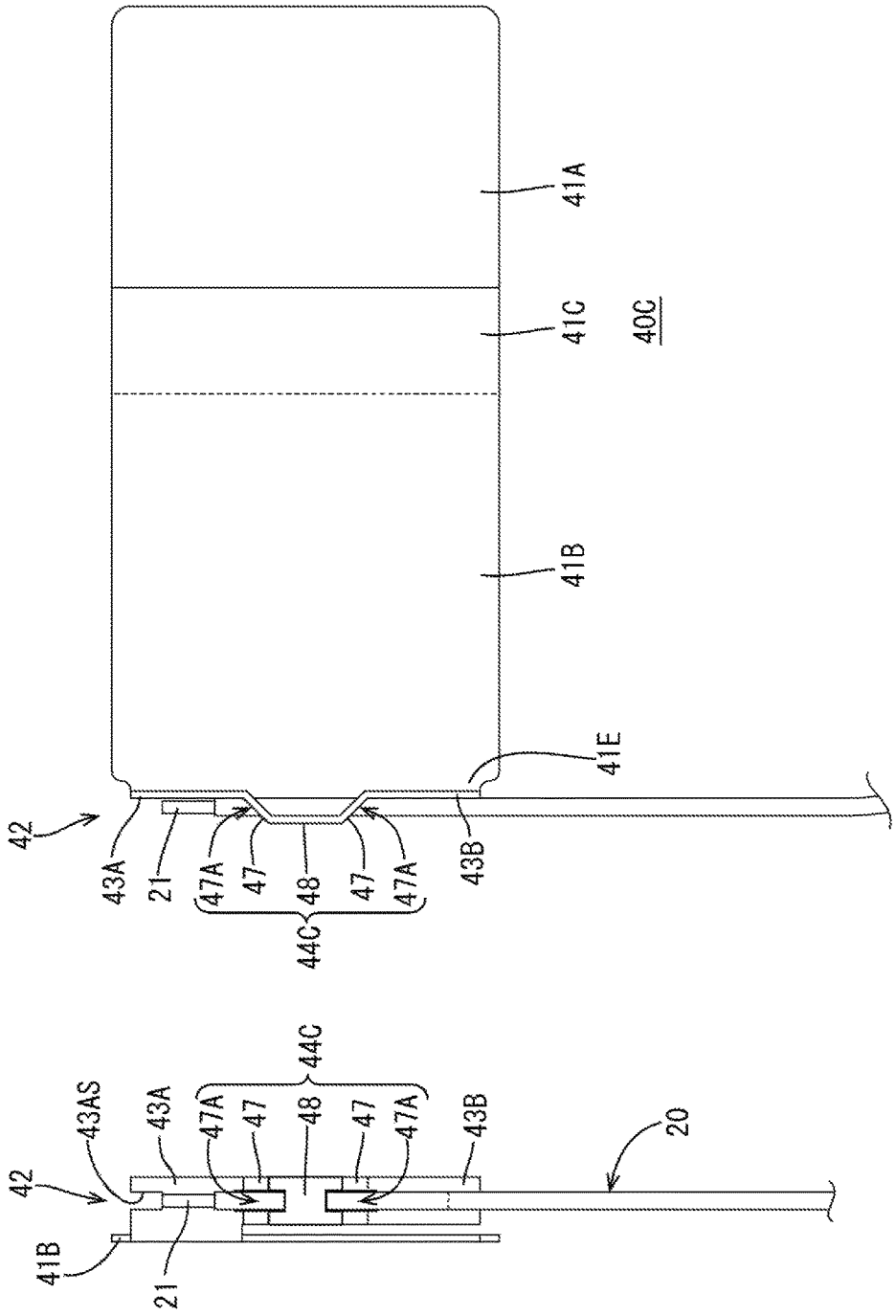

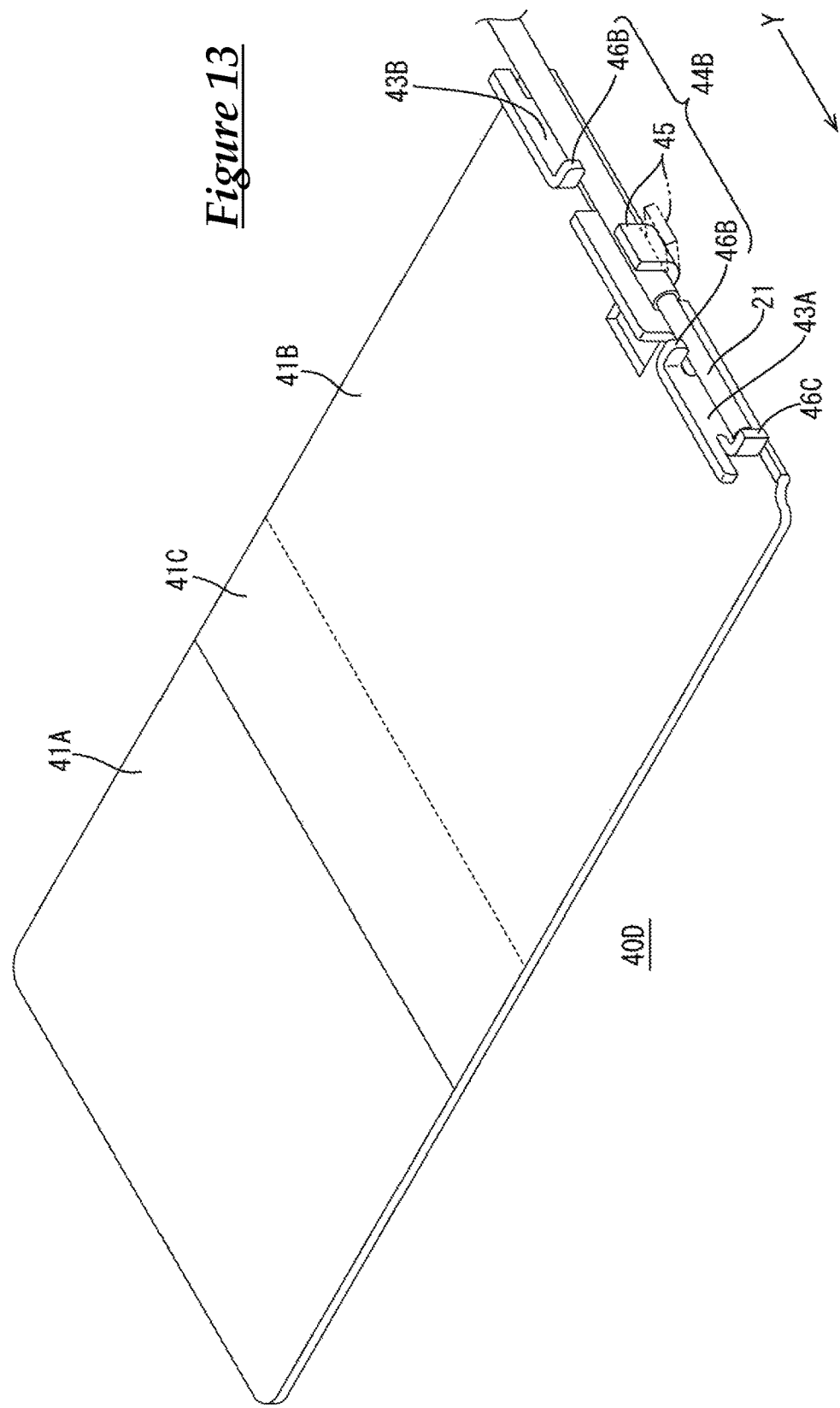

BUS BAR AND CONNECTION MODULE PROVIDED WITH THE BUS BAR

CROSS REFERENCE TO RELATED APPLICATIONS

This application claims the priority of Japanese patent application JP2017-118518 filed on Jun. 16, 2017, the entire contents of which are incorporated herein.

TECHNICAL FIELD

The technology disclosed in the present specification relates to a bus bar and a connection module that is provided with the bus bar, and specifically relates to a bus bar configuration for connecting coated electrical wires to a bus bar that is joined to electrode terminals of electricity storage elements.

BACKGROUND ART

Conventionally, a wiring module that is disclosed in JP 2013-143181A is known as a wiring module that is attached to a plurality of electricity storage elements. JP 2013-143181A discloses technology for connecting a detection electrical wire to a bus bar, which connects electrode terminals of electric cells (electricity storage elements) that are adjacent to each other, using an electrical wire connecting portion that includes: a wire barrel portion (a core wire connection portion) that is provided in a central portion of the bus bar in plan view; and an insulation barrel portion (a crimp portion) that holds the detection electrical wire (a coated electrical wire).

JP 2013-143181A is an example of related art.

SUMMARY

The above-described conventional art shows an example in which the detection wire is connected to the bus bar by crimping the wire barrel portion onto the core wire of the detection electrical wire. However, this is not the only method for connecting the bus bar to the detection electrical wire, and it is possible to conceive of connecting the core wire of the detection electrical wire to the bus bar through welding such as ultrasonic welding, for example, as in the case of connecting an electrical wire to a terminal. In this regard, it is necessary to position the electrical wire to connect it to the bus bar, and hold the electrical wire after connecting it to the bus bar. However, due to a demand for a downsized product, it is not easy to secure sufficient space for a member that can perform such positioning and holding. Therefore, there has been a demand for a bus bar that requires less installation space, and can reliably position and hold an electric wire. In particular, there has been a demand to position and hold an electrical wire in the axial direction of the electrical wire and in the vertical direction.

The technology disclosed in the present specification has been completed considering the above-described situation, and provides a bus bar that requires less installation space, and can reliably position and hold an electric wire in the axial direction of the electrical wire and in the vertical direction.

The bus bar disclosed in the present specification is a bus bar to which an electrical wire is to be connected, and that is to be joined to an electrode terminal of an electricity storage element, the electrical wire including a core wire and an insulation coating that covers the core wire, the bus bar including: an electrical wire connection portion that is constituted by a member included in the bus bar, is provided in an end portion of the bus bar, and to which an end portion of the electrical wire is to be connected. The electrical wire connection portion includes: a core wire connection portion to which the core wire of the electrical wire is to be connected; and a positioning and holding portion that is configured to position the electrical wire in a direction that is orthogonal to an axial direction of the electrical wire in plan view, and to hold the electrical wire.

With this configuration, the positioning and holding portion of the electrical wire connection portion constituting a portion of the bus bar has the function of positioning the electrical wire and the function of holding the electrical wire. Therefore, a bus bar with this configuration requires less installation space, and can reliably position and hold an electric wire in the axial direction of the electrical wire and in the vertical direction.

The above-described bus bar may further include a crimp portion that is configured to be crimped onto the insulation coating, and the positioning and holding portion may include: the crimp portion; and a wall portion that is located so as to face the crimp portion, with a routing space for the electrical wire being interposed therebetween.

With this configuration, it is easy to form the crimp portion and the wall portion, which are included in the positioning and holding portion provided in the end portion of the bus bar, by stamping and bending a metal plate that is a material of the bus bar, for example.

The above-described bus bar may further include a crimp portion that is configured to be crimped onto the insulation coating, and the positioning and holding portion may include: the crimp portion; and two wall portions that are respectively provided at two positions outside two ends of the crimp portion in a direction in which the electrical wire is routed, and are configured to hold the electrical wire in conjunction with the crimp portion.

With this configuration, the wall portions are distributed at two positions, and the electrical wire can be held such that the held section thereof is longer than when a wall portion is located at only one position.

The above-described bus bar may further include a crimp portion that is configured to be crimped onto the insulation coating, and the positioning and holding portion may include: the crimp portion; and two wall portions that are respectively provided at two positions outside two ends of the crimp portion in a direction in which the electrical wire is routed, so as to be orthogonal to the crimp portion, and are configured to hold the electrical wire at side portions of the wall portions, in conjunction with the crimp portion.

With this configuration, the electrical wire is positioned and held by the side portions (the thick portions) of the wall portions. When this configuration is employed, the wall portions are formed by bending a metal plate that is a material of the bus bar, in the lengthwise direction of the electrical wire connection portion. Therefore, it is easier to form the wall portions compared to when the wall portions are formed by bending a metal plate, which is a material of the bus bar, in the widthwise direction of the electrical wire connection portion, and this is advantageous in terms of the production yields of the wall portions.

In the above-described bus bar, the positioning and holding portion may be constituted by a bent protruding portion that is provided adjacent to the core wire connection portion, the bent protruding portion may include a top portion and routing walls that are respectively provided at two ends of the top portion in a direction in which the electrical wire is routed, and the routing walls may be respectively provided with insertion holes that are configured to hold the electrical wire and into which the electrical wire is to be inserted.

With this configuration, it is possible to position and hold the electrical wire without forming the crimp portion as the positioning and holding portion. Therefore, it is unnecessary to form the crimp portion, and it is possible to more easily form the positioning and holding portion.

In the above-described bus bar, the core wire connection portion may include a restriction portion that is configured to restrict the electrical wire from moving in the axial direction of the electrical wire.

With this configuration, the restriction portion prevents the electrical wire from moving in the axial direction of the electrical wire during welding. Consequently, the reliability of connection is improved.

In the above-described bus bar, the core wire connection portion may include a cutout portion against which a restriction jig is abutted, the restriction jig restricting the electrical wire from moving in the axial direction of the electrical wire.

With this configuration, the electrical wire is restricted from moving in the axial direction of the electrical wire while the core wire is connected to the core wire connection portion, by a predetermined restriction jig abutted against the cutout portion. Consequently, the reliability of connection is improved.

In the above-described bus bar, the positioning and holding portion may be provided in a central portion of the electrical wire connection portion in plan view, and the electrical wire connection portion may include the core wire connection portion on each side of the positioning and holding portion.

With this configuration, the core wire connection portion is provided on each side of the positioning holding portion. Therefore, the electrical wire can be connected to the bus bar in a direction that is selected from two directions that are 180° different from each other. This improves flexibility when attaching the bus bar to a bus bar holding portion.

The wiring module disclosed in the present specification is a wiring module that is to be attached to a plurality of electricity storage elements each having a pair of electrode terminals composed of positive and negative electrode terminals, the wiring module including: any of the above-described bus bars; an insulation protector that includes a bus bar holding portion that holds the bus bar; and a detection electrical wire that is the electrical wire and is placed on the insulation protector to detect states of the electricity storage elements.

With this configuration, in a wiring module that includes a bus bar and a detection electrical wire, the bus bar requires less installation space, and can position and hold an electric wire so that welding can be performed.

The bus bar disclosed in the present specification requires less installation space, and can reliably position and hold an electric wire in the axial direction of the electrical wire and in the vertical direction.

BRIEF DESCRIPTION OF THE DRAWINGS

FIG. 4A is a side view showing how a detection wire is drawn out from the bus bar according to the first embodiment, and FIG. 4B is a plan view showing the same.

FIG. 7 is a perspective view of a bus bar according to a second embodiment.

FIG. 8A is a side view showing how a detection wire is drawn out from the bus bar according to the second embodiment, and FIG. 8B is a plan view showing the same.

FIG. 10A is a side view showing how a detection wire is drawn out from the bus bar according to the third embodiment, and FIG. 10B is a plan view showing the same.

FIG. 11 is a perspective view of a bus bar according to a fourth embodiment.

FIG. 12A is a side view showing how a detection wire is drawn out from the bus bar according to the fourth embodiment, and FIG. 12B is a plan view showing the same.

FIG. 13 is a perspective view of a bus bar according to another embodiment.

EMBODIMENTS

First Embodiment

Figure 1:
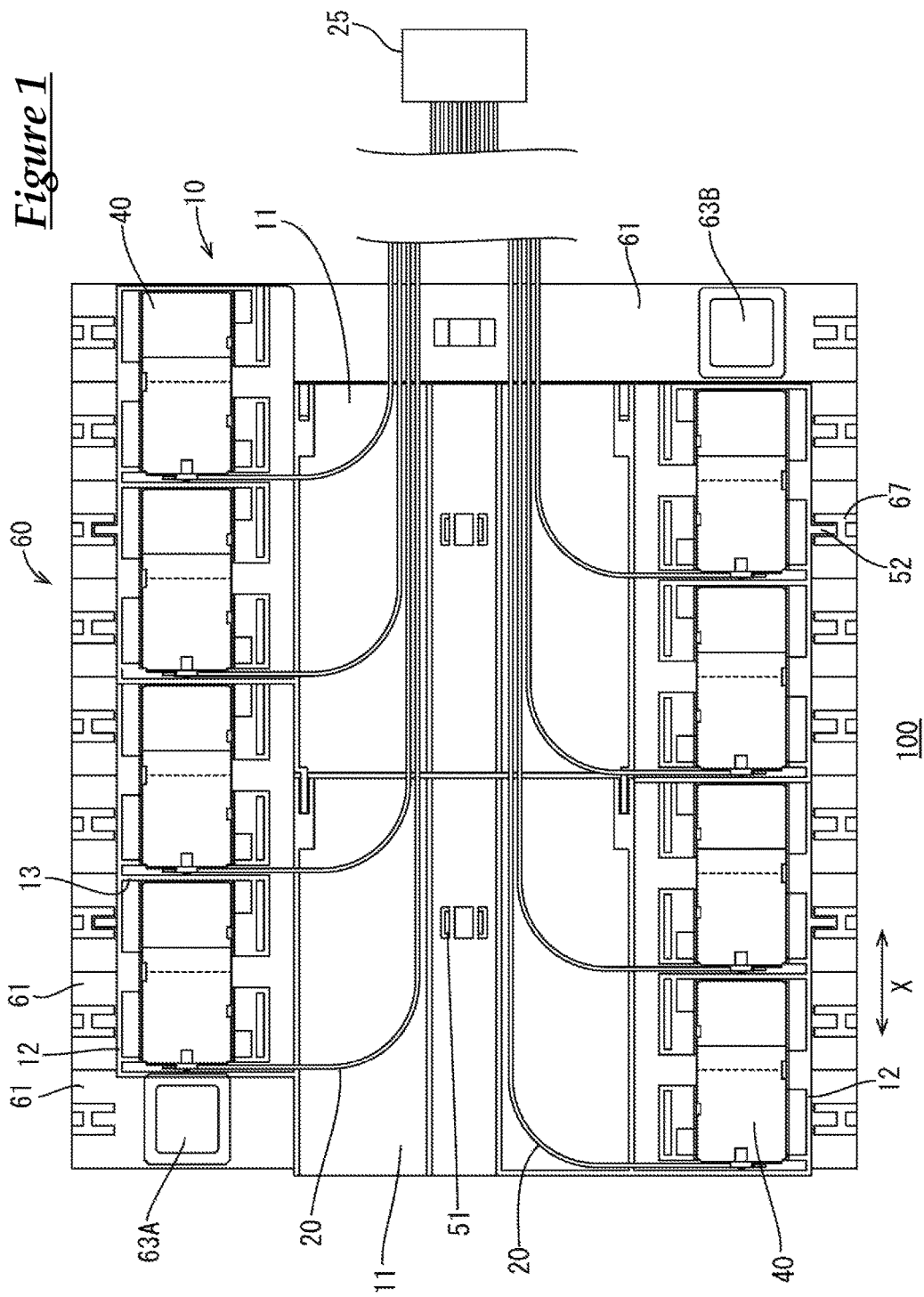
FIG. 1 is a schematic plan view showing a state in which a wiring module according to a first embodiment is attached to an electricity storage element group.

The following describes a first embodiment with reference to FIGS. 1 to 6. Note that an electricity storage module 100 shown in FIG. 1 is, for example, mounted on a vehicle such as an electric vehicle or a hybrid vehicle (not shown), and is used as a driving source to drive the vehicle. In the following description, in some cases, only one member out of a plurality of identical members may be assigned a reference numeral, and the reference numerals of the other members may be omitted.

Figure 2:
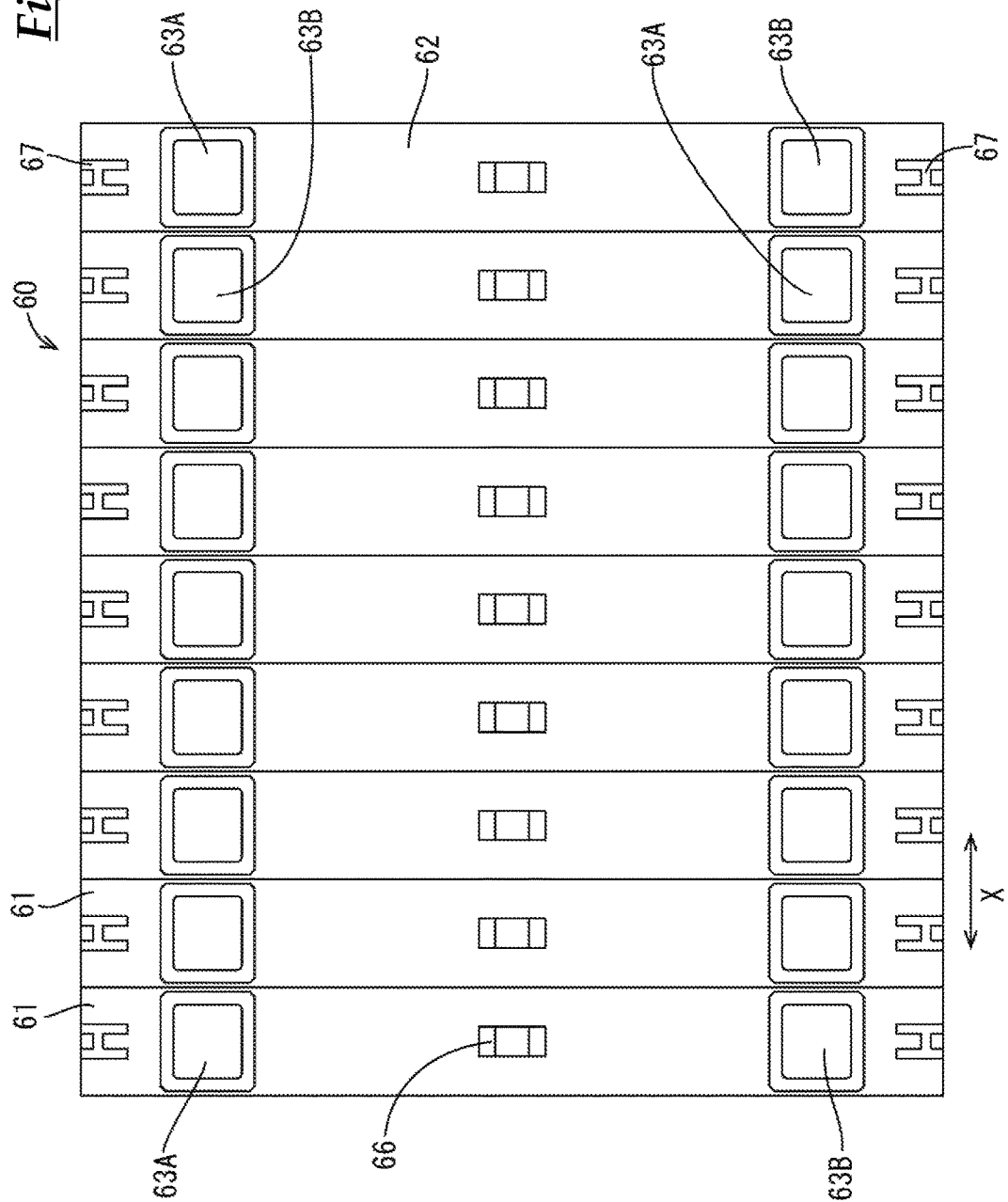
FIG. 2 is a plan view of the electricity storage element group.

As shown in FIGS. 1 and 2, the electricity storage module 100 according to the present embodiment mainly includes an electricity storage element group 60 (see FIG. 2) formed by arranging a plurality of electricity storage elements 61, and a wiring module 10 that is placed on the electricity storage element group 60.

The electricity storage elements 61 are secondary cells, for example. As shown in FIG. 2, a plurality of (nine in the present embodiment) electricity storage elements 61 are arranged in a row to form the electricity storage element group 60.

Each of the electricity storage elements 61 has a flat, rectangular parallelepiped external shape, and, as shown in FIG. 2, an electrode mounting surface 62 that is orthogonal to a surface that faces an electricity storage element 61 that is adjacent thereto. A pair of electrode terminals 63 are provided on the electrode mounting surface 62, at positions close to the ends in the lengthwise direction. One of the electrode terminals 63 is a positive electrode terminal 63A, and the other is a negative electrode terminal 63B. Each of the electrode terminals 63 is made of metal, and has a rectangular tube shape protruding from the electrode mounting surface 62. In the present embodiment, the positive electrode terminals 63A are made of aluminum, and the negative electrode terminals 63B are made of copper. However, this is not essential. For example, both of the positive electrode terminals 63A and the negative electrode terminals 63B may be made of copper.

A fitting portion 66, into which a positioning and holding portion 51 of an insulation protector 11 provided in the wiring module 10 is fitted, is provided in a central portion between the pair of electrode terminals 63 on the electrode mounting surface 62 of each of the electricity storage elements 61. Also, fitting portions 67, into which protruding portions 52 of the insulation protector 11 are fitted, are respectively provided on two end portions of the electrode mounting surface 62 of each of the electricity storage elements 61.

The plurality of electricity storage elements 61 are arranged such that, on two electricity storage elements 61 that are adjacent each other, electrode terminals 63 that have different polarities are adjacent to each other (i.e. the positive electrode terminal 63A of one electricity storage element 61 and the negative electrode terminal 63B of another electricity storage element 61 that is adjacent to the electricity storage element 61 are adjacent to each other).

The wiring module 10 is a member that is to be attached to a surface that is constituted by the electrode mounting surfaces 62 of the electricity storage elements 61 in the electricity storage element group 60. As shown in FIG. 1, the wiring module 10 includes, for example: two insulation protectors 11; bus bars 40 that are held by the insulation protectors 11 and that each connect a positive electrode terminal 63A and a negative electrode terminal 63B of electricity storage elements 61 that are adjacent to each other; electrical wire connection portions 42 that are formed on the bus bars 40; and detection electrical wires 20 that are connected to the electrical wire connection portions 42.

Figure 3:
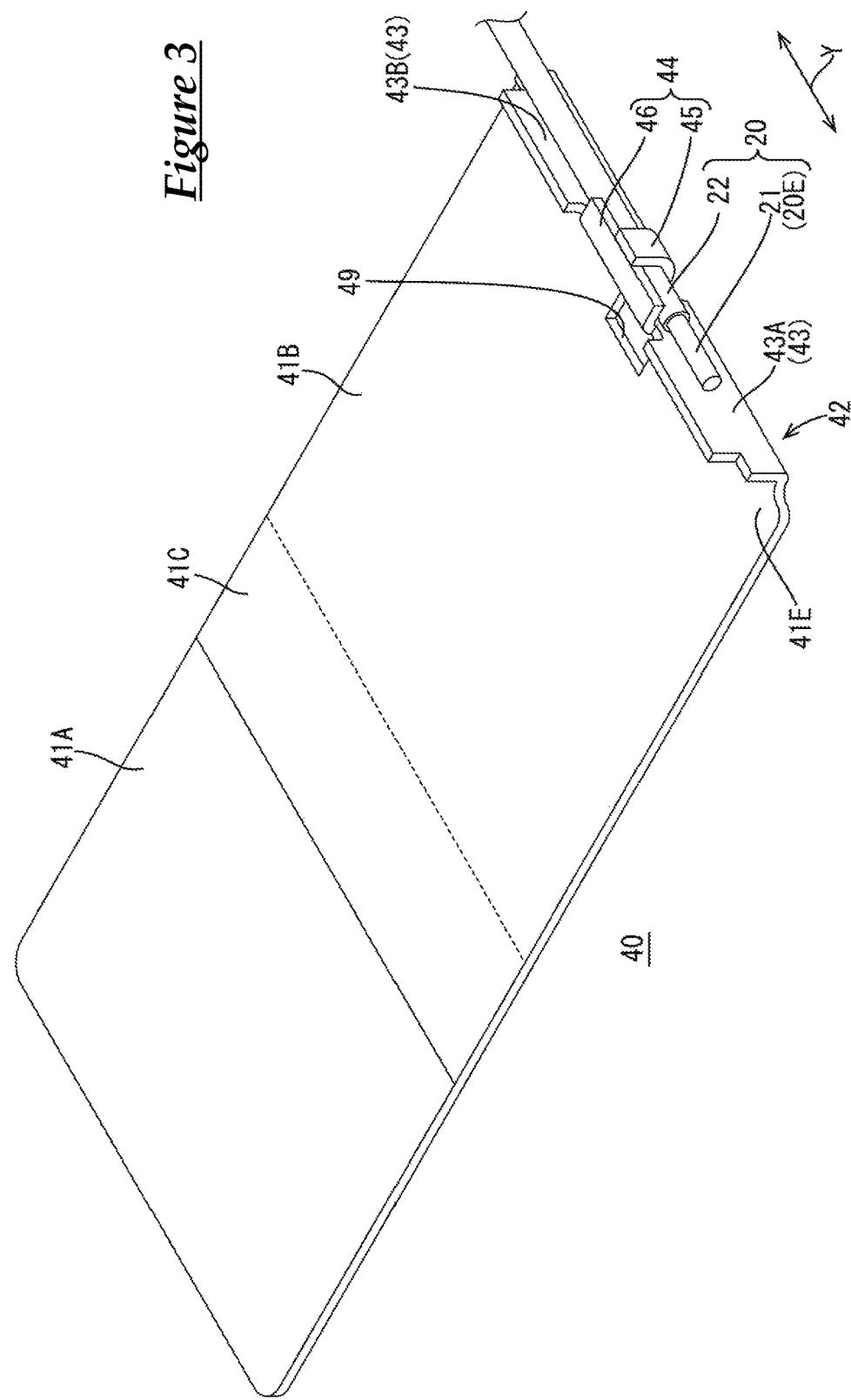
FIG. 3 is a perspective view of a bus bar according to the first embodiment.

As shown in FIG. 3, each detection electrical wire 20 includes a core wire 21 and an insulation coating 22 that covers the core wire 21, and is placed on an insulation protector 11 to detect the states of electricity storage elements 61 (to detect voltage across electricity storage elements 61 in the present embodiment). One end (end portion) 20E of a detection electrical wire 20 is connected to an electrical wire connection portion 42, and the other end is connected to a connector 25 (see FIG. 1). The connector 25 is connected to an external control unit (not shown) that processes the detected information. The detection electrical wires 20 are examples of electrical wires.

Also, in the present embodiment, as shown in FIG. 1, the two insulation protectors 11 are lined up in a direction in which the plurality of electricity storage elements 61 are lined up (in the direction indicated by the arrow X). The insulation protectors 11 are constituted by insulative members that are made of a synthetic resin or the like. As shown in FIG. 1, each of the insulation protectors 11 is open in a top-bottom direction (in a direction that is orthogonal to the sheet of FIG. 1), and includes, for example, a pair of bus bar holding portions 12 that house and hold a bus bar 40.

Also, each of the insulation protectors 11 is provided with a positioning and holding portion 51 that is fitted into the fitting portion 66 of an electricity storage element 61, and protruding portions 52 that are fitted into the fitting portions 67 of electricity storage elements 61.

Each of the bus bar holding portions 12 includes a housing wall 13 that has a square tubular shape and holds bus bars 40 therein so as to insulate the bus bars 40 from bus bars 40 that are adjacent thereto. The housing wall 13 also serves as a protection wall for electrode terminals 63 that are adjacent to each other.

Next, the following describes the configurations of the bus bars 40 with reference to FIGS. 3 to 6. The detection electrical wires 20 are connected to the bus bars 40, and each bus bar 40 is joined to the electrode terminals 63 of electricity storage elements 61.

As shown in FIG. 4B, each bus bar 40 is a plate-shaped member that has four corners cut out into flat rectangles, and has a substantially rectangular shape overall. Specifically, each bus bar 40 is formed by, for example, punching out a clad material (a metal plate) formed by bonding two kinds of metal plates, namely an aluminum thin plate 41A and a copper thin plate 41B, to each other. That is, each bus bar 40 includes an aluminum thin plate 41A corresponding to the positive electrode terminal 63A that is made of aluminum, a copper thin plate 41B corresponding to the negative electrode terminal 63B that is made of copper, and a bonding portion 41C. However, this is not essential, and the bus bars 40 may be made of, for example, a copper alloy, an aluminum alloy, or stainless steel (SUS). Also, the material is not limited to a clad material, and the bus bars 40 may be constituted by one type of metal plate.

As shown in FIGS. 3, 4A, and 4B, each bus bar 40 is provided with an electrical wire connection portion 42, which is formed as part of the bus bar 40. In the present embodiment, the electrical wire connection portion 42 is formed by punching out and bending the copper thin plate 41B included in the bus bar 40. As shown in FIG. 4B, the electrical wire connection portion 42 is formed in an end portion 41E in the lengthwise direction (corresponding to a short side) of the bus bar 40. Depending on the layout of the electricity storage elements 61, the aluminum thin plate 41A and the copper thin plate 41B of the bus bar 40 may have a reverse positional relationship compared to FIG. 4B in a left-right direction. If this is the case, the electrical wire connection portion 42 is constituted by the aluminum thin plate 41A. The end portion of the bus bar 40 in which the electrical wire connection portion 42 is formed is not necessarily the end portion 41E in the lengthwise direction (the direction indicated by the arrow X in FIG. 4B), i.e. not necessarily an end portion corresponding to a short side. The electrical wire connection portion 42 may be formed in, for example, an end portion of the bus bar 40 in a direction that is orthogonal to the lengthwise direction, i.e. an end portion corresponding to a long side of the bus bar 40.

As shown in FIG. 3, each electrical wire connection portion 42 includes a pair of core wire connection portions 43, a positioning and holding portion 44, a crimp portion (insulation barrel) 45, and a wall portion 46.

As shown in FIG. 3, the pair of core wire connection portions 43 are provided on both sides of the positioning and holding portion 44, and include a first core wire connection portion 43A and a second core wire connection portion 43B. In the present embodiment, a core wire 21 of the detection electrical wire 20 (the end portion 20E of the detection electrical wire 20) is connected to the first core wire connection portion 43A. However, this is not essential, and the detection electrical wire 20 may be routed from the opposite direction compared to FIG. 3, and the core wire 21 of the detection electrical wire 20 may be connected to the second core wire connection portion 43B. In other words, the detection electrical wire 20 can be drawn out from the electrical wire connection portion 42 in a direction that is 180° different. However, this is not essential, and the second core wire connection portion 43B may be omitted. In other words, only one core wire connection portion 43 may be provided at one position of the electrical wire connection portion 42.

Specifically, FIG. 4 shows how a detection electrical wire 20 is connected to a bus bar 40 in the upper row out of the bus bars 40 in FIG. 1, which are arranged in the left-right direction in two rows, namely the upper row and the lower row. If the detection electrical wires 20 are connected to the second core wire connection portions 43B, the detection electrical wires 20 are connected in the manner in which the detection electrical wires 20 in the lower row in FIG. 1 are connected. In the present embodiment, the core wires 21 of the detection electrical wires 20 are connected to the core wire connection portions 43 through ultrasonic welding. However, this is not essential, and welding may be resistance welding. Furthermore, the method for connection is not limited to welding, and may be soldering.

The positioning and holding portion 44 positions the detection electrical wire 20, which has not been connected, in a direction (the direction indicated by the arrow Z in FIG. 4A) that is orthogonal to the axial direction of the detection electrical wire 20 (the direction indicated by the arrow Y in FIG. 4A) in plan view, and holds the detection electrical wire 20 after the detection electrical wire 20 is connected.

Figure 5:
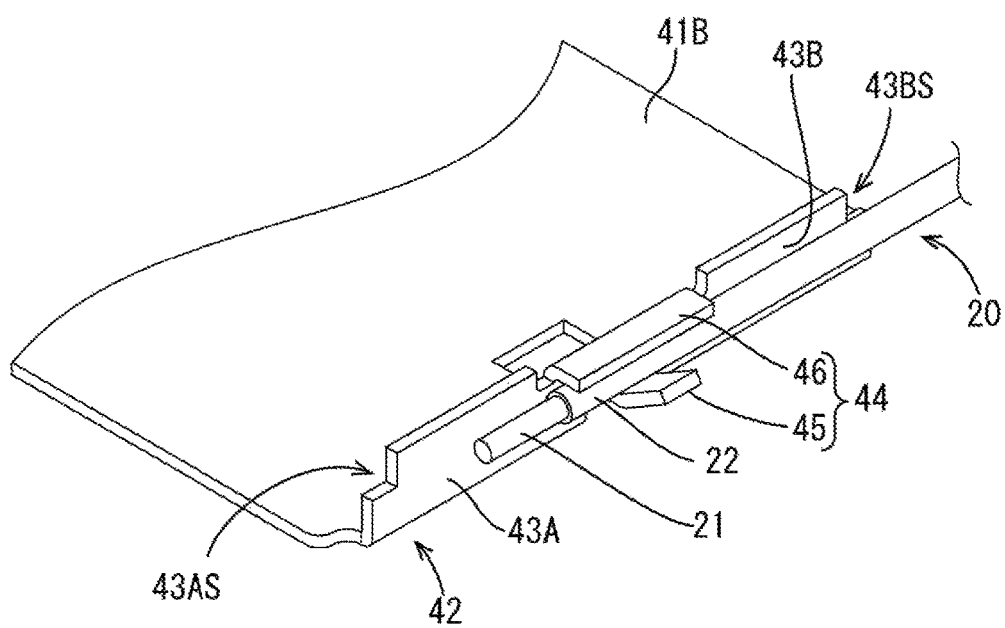
FIG. 5 is a partial perspective view showing a state before a crimp portion in FIG. 3 is crimped.
Figure 6:
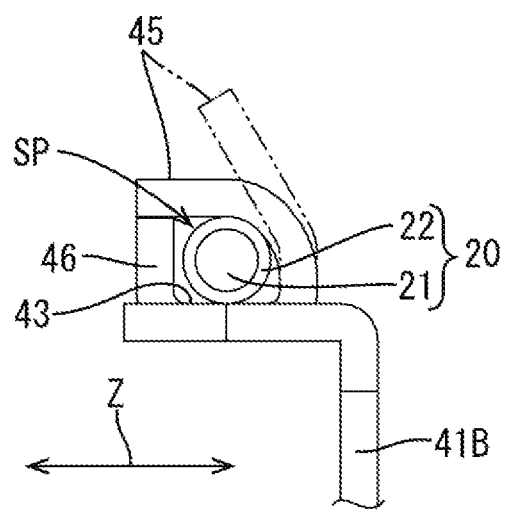
FIG. 6 shows states before and after the crimp portion is crimped.

The crimp portion 45 is crimped onto the insulation coating 22 of the detection electrical wire 20 after the core wire 21 of the detection electrical wire 20 is connected. FIG. 5 shows the state of the crimp portion 45 that has not been crimped. The dashed lines in FIG. 6 indicate the crimp portion 45 that has not been crimped (the same applies to the following). As shown in FIG. 6, the crimp portion 45 indicated by the solid lines, which has been crimped, is placed over the wall portion 46, to close a routing space SP. As a result, the detection electrical wire 20, which has been connected, is reliably held in a direction (the direction indicated by the arrow Z in FIG. 6) that is orthogonal to the axial direction of the detection electrical wire 20, and the detection electrical wire 20 is prevented from moving in the direction indicated by the arrow Z in FIG. 6. Thus, it is possible to reduce stress that is applied to the connection portion of the detection electrical wire 20, and improve the reliability of the connection portion.

The wall portion 46 is located so as to face the crimp portion 45, with the routing space SP for the detection electrical wire 20 being interposed therebetween (see FIGS. 5 and 6). The wall portion 46 is provided between the pair of core wire connection portions 43, and is bent in the direction that is orthogonal to the surfaces of the core wire connection portions 43 (see FIGS. 3 and 6).

At the time of welding, as shown in FIG. 5, the detection electrical wire 20 is routed and positioned in the routing space SP (see FIG. 6) between the crimp portion 45, which has not been crimped, and the wall portion 46. In the present embodiment, the positioning and holding portion 44 includes the crimp portion 45 and the wall portion 46.

Note that each bus bar 40 is provided with a through hole 49 that is cut out to form the crimp portion 45. The through hole 49 is used to crimp the crimp portion 45. The shapes of the crimp portion 45 and wall portion 46 are not limited to those shown in FIG. 3 and so on. For example, the crimp portion 45 and the wall portion 46 do not necessarily have a shape that completely surrounds the routing space SP in a state where the crimp portion 45 is crimped as shown in FIG. 6. In addition, the wall portion 46 may have any height and any length.

To assemble the above-described wiring module 10 according to the present embodiment, first, two insulation protectors 11 are coupled to each other. Next, bus bars 40 to which detection electrical wires 20 are connected are housed in the bus bar holding portions 12 of the insulation protectors 11.

To connect the detection electrical wires 20 to the bus bars 40, the core wires 21 of the detection electrical wires 20 are connected to the first core wire connection portions 43A or the second core wire connection portions 43B in a state where the detection electrical wires 20 are positioned by the positioning and holding portions 44. Such connection is realized through ultrasonic welding, resistance welding, soldering, or the like. Next, the crimp portions 45 of the electrical wire connection portions 42 are crimped onto the insulation coatings 22 of the detection electrical wires 20 using the through holes 49 provided in the bus bars 40, and thus the detection electrical wires 20 are fixed to the electrical wire connection portions 42. Consequently, connection of the detection electrical wires 20 to the bus bars 40 is complete.

The welded portions of the back surfaces (the lower surfaces) of the bus bars 40 housed in the bus bar holding portions 12 are exposed downward to the outside. Next, the detection electrical wires 20 connected to the electrical wire connection portions 42 of the bus bars 40 are disposed at predetermined positions in the insulation protectors 11.

The wiring module 10 thus assembled is attached to the electrode mounting surfaces 62 of the electricity storage element group 60 using the protruding portions 52 of the insulation protectors 11, the fitting portions 67 of the electricity storage elements 61, and so on. At this time, the leading end portions (the upper surfaces) of the electrode terminals 63 abut against the lower surfaces of the bus bars 40, which are exposed downward to the outside. In this state, a laser is emitted to predetermined positions of the bus bars 40 using a laser irradiation device (not shown) that is provided above the wiring module 10, and thus the bus bars 40 and the electrode terminals 63 are welded to each other through laser welding. Thus, the electricity storage module 100 shown in FIG. 1 is complete.

The positioning and holding portion 44 (constituted by the crimp portion 45 and the wall portion 46) of an electrical wire connection portion 42 formed by utilizing a portion of a bus bar 40, specifically a portion of the copper thin plate 41B of the bus bar 40, has both the function of positioning a detection electrical wire 20 and the function of holding the detection electrical wire 20. Therefore, the bus bar 40 according to the present embodiment requires less installation space, and can position and hold the detection electrical wire 20.

Also, the crimp portion 45 and the wall portion 46 that constitute the positioning and holding portion 44 can be easily formed in the end portion 41E of the bus bar 40 by, for example, punching out (stamping) and bending a metal plate (the copper thin plate 41B) that is a material of the bus bar 40.

Also, the core wire connection portions 43 are provided on both sides of the positioning and holding portion 44. Therefore, the detection electrical wire 20 can be connected to the bus bar 40 in a direction that is selected from two directions that are 180° different from each other. This improves flexibility when attaching the bus bar 40 to the bus bar holding portion 12. That is, as shown in FIG. 1, the detection electrical wires 20 can be easily routed in the wiring module 10 in which the bus bar holding portions 12 are provided in two rows, namely the upper row and the lower row.

Second Embodiment

Next, the following describes a second embodiment with reference to FIGS. 7 and 8. Note that the second embodiment is only different from the first embodiment in the configurations of the electrical wire connection portions 42 of bus bars 40A, specifically the configurations of the positioning and holding portions 44 of the electrical wire connection portions 42. Therefore, the following only describes the differences. The same configurations as those in the first embodiment are assigned the same reference numerals, and descriptions thereof are omitted.

As shown in FIGS. 7 and 8, a positioning and holding portion 44A of an electrical wire connection portion 42 in the second embodiment is constituted by a crimp portion 45 and wall portions 46A that are separated from each other at two positions.

The wall portions 46A that are separated from each other at two positions are respectively provided outside the two ends of the crimp portion 45 in a direction in which the detection electrical wire 20 is routed (the direction indicated by the arrow Y in FIG. 7), and sandwich the detection electrical wire 20 with the crimp portion 45.

With such a configuration of the positioning and holding portion 44A, the wall portions 46A are distributed at two positions, and thus three point holding is realized by the wall portions 46A and the crimp portion 45. Therefore, a longer section of the detection electrical wire 20 can be held compared to when a wall portion is located at only one position (compared to two point holding).

Note that the shapes of the crimp portion 45 and wall portions 46A are not limited to those shown in FIG. 7.

Third Embodiment

Figure 9:
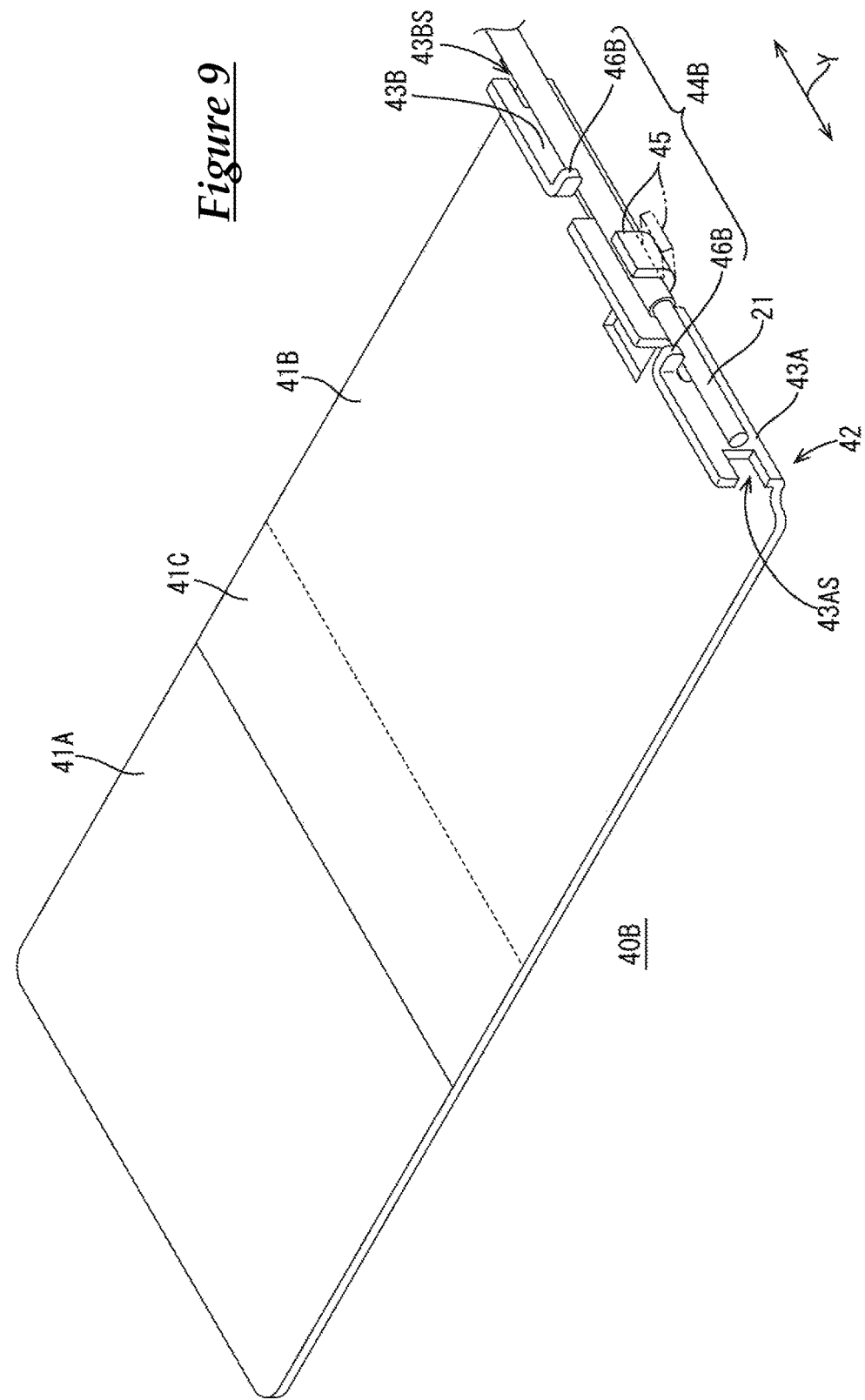
FIG. 9 is a perspective view of a bus bar according to a third embodiment.

Next, the following describes a third embodiment with reference to FIGS. 9 and 10. Note that the third embodiment is, as with the second embodiment, only different from the first embodiment in the configurations of the positioning and holding portions 44 of the electrical wire connection portions 42 in bus bars 40B. Therefore, the following only describes the differences. The same configurations as those in the first embodiment are assigned the same reference numerals, and descriptions thereof are omitted.

As shown in FIGS. 9 and 10, a positioning and holding portion 44B of an electrical wire connection portion 42 in the third embodiment is, as in the second embodiment, constituted by a crimp portion 45 and two wall portions 46B that are separated from each other at two positions. However, the third embodiment is different from the second embodiment in the following points.

That is, the wall portions 46B that are separated from each other at two positions are provided at two positions outside the two ends of the crimp portion 45 in a direction in which the detection electrical wire 20 is routed (the direction indicated by the arrow Y in FIG. 9) so as to be orthogonal to the crimp portion 45, and the detection electrical wire 20 is held between side portions of the wall portions 46B and the crimp portion 45.

With such a configuration of the positioning and holding portion 44B, the detection electrical wire 20 is positioned and held by side portions (thick portions) of the wall portions 46B. When this configuration is employed, the wall portions 46B are formed by bending the metal plate 41B, which is the material of the bus bar 40, in the lengthwise direction of the electrical wire connection portion 42. Therefore, it is easier to form the wall portion 46 compared to when the wall portion 46 is formed by bending the metal plate 41B, which is a material of the bus bar 40, in the widthwise direction of the electrical wire connection portion 42, and this is advantageous in terms of the production yields of the wall portion 46.

In the third embodiment, as shown in FIG. 9, the core wire connection portions (43A and 43B) of the electrical wire connection portion 42 are provided with cutout portions (43AS and 43BS) against which a restriction jig is abutted. The restriction jig restricts the electrical wire from moving in the axial direction (the direction indicated by the arrow Y). With this configuration, when the core wire 21 is to be connected to the core wire connection portion 43A, a predetermined restriction jig is abutted against the cutout portion 43AS, and thus the detection electrical wire 20 is restricted from moving in the axial direction during connection. Consequently, the reliability of connection is improved. The cutout portions (43AS and 43BS) may be omitted, or provided in the first embodiment and the second embodiment.

The shapes of the crimp portion 45 and wall portions 46B are not limited to those shown in FIG. 9.

Fourth Embodiment

Next, the following describes a fourth embodiment with reference to FIGS. 11 and 12. Note that the fourth embodiment is, as with the second embodiment and the third embodiment, only different from the first embodiment in the configurations of the positioning and holding portions 44 of the electrical wire connection portions 42 in bus bars 40C. Therefore, the following only describes the difference. The same configurations as those in the first embodiment are assigned the same reference numerals, and descriptions thereof are omitted.

As shown in FIGS. 11 and 12, a positioning and holding portion of an electrical wire connection portion 42 in the fourth embodiment is constituted by a bent protruding portion 44C that is provided so as to be adjacent to the core wire connection portions 43.

The bent protruding portion 44C includes a top portion 48 and tapered walls (examples of the routing walls) 47 that are respectively provided at the two ends of the top portion 48 in a direction in which the detection electrical wire 20 is routed (the direction indicated by the arrow Y in FIG. 11). The tapered walls 47 (specifically, portions of the top portion 48 as well) are respectively provided with insertion holes 47A that hold a detection electrical wire 20 and into which the detection electrical wire 20 is inserted.

With such a configuration of the positioning and holding portion (bent protruding portion) 44C, a detection electrical wire 20 is inserted into the two insertion holes 47A so as to penetrate therethrough, and is routed. Thus, it is possible to position and hold the detection electrical wire 20 without forming the crimp portion 45 as the positioning and holding portion. Therefore, it is only necessary to form the bent protruding portion 44C as the positioning and holding portion, and thus it is easier to form the positioning and holding portion.

Note that the shape of the bent protruding portion 44C is not limited to that shown in FIG. 11. For example, the routing walls are not limited to the tapered walls 47 that have inclined surfaces, and may be vertical walls.

Other Embodiments

The technology disclosed in the present specification is not limited to the embodiments described in the above description with reference to the drawings, and for example, the following embodiments are included in the technical scope.

In the above-described embodiments, as shown in a bus bar 40D in FIG. 13, the first core wire connection portion 43A (or the second core wire connection portion 43B) may be provided with a restriction wall (an example of the restriction portion) 46C that restricts the detection electrical wire 20 from moving in the axial direction. If this is the case, when the core wire 21 of the detection electrical wire 20 is to be connected to the first core wire connection portion 43A, for example, the restriction wall (an example of the restriction portion) 46C restricts the detection electrical wire 20 from moving in the axial direction, especially in the direction indicated by the arrow Y in FIG. 13, during ultrasonic welding, for example. Consequently, the core wire 21 is prevented from jutting forward (in the direction indicated by the arrow Y) form the first core wire connection portion 43A, and the reliability of connection is improved.

The above-described embodiments show an example in which the bus bars 40 and the electrode terminals 63 of the electricity storage elements 61 are connected through laser welding. However, the technology disclosed in the present specification is also applicable to a wiring module that has a configuration in which connection is realized by bolts and nuts fastened to each other. That is, the shape and configuration of the areas that are connected to the electrode terminals 63 of the bus bars are not limited to the shape and configuration shown in FIG. 3 and so on. For example, the bus bars may be provided with through holes that allow the electrode terminals 63 to pass therethrough.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10: Wiring Module
11: Insulation Protector
12: Bus Bar Holding Portion
20: Detection Electrical Wire
21: Core Wire
22: Insulation Coating
40, 40A, 40B, 40C: Bus Bar
41E: End Portion of Bus Bar
42: Electrical Wire Connection Portion
43A: First Core Wire Connection Portion (Core Wire Connection Portion)
43AS, 43BS: Cutout Portion
44, 44A, 44B: Positioning and Holding Portion
44C: Bent Protruding Portion (Positioning and Holding Portion)
45: Crimp Portion
46, 46A, 46B: Wall Portion
46C: Restriction Wall
47: Tapered Wall (Routing Wall)
47A: Insertion Hole
48: Top Portion
SP: Routing Space

What is claimed is:

1. A bus bar to which an electrical wire is to be connected, and that is to be joined to an electrode terminal of an electricity storage element, the electrical wire including a core wire and an insulation coating that covers the core wire, the bus bar comprising:
    an electrical wire connection portion that is constituted by a member included in the bus bar, is provided in an end portion of the bus bar, and to which an end portion of the electrical wire is to be connected,
    wherein the electrical wire connection portion includes:
    a core wire connection portion to which the core wire of the electrical wire is to be connected; and
    a positioning and holding portion that is configured to position the electrical wire in a direction that is orthogonal to an axial direction of the electrical wire in plan view, and to hold the electrical wire.

2. The bus bar according to claim 1, further comprising:
    a crimp portion that is configured to be crimped onto the insulation coating,
    wherein the positioning and holding portion includes:
    the crimp portion; and
    a wall portion that is located so as to face the crimp portion, with a routing space for the electrical wire being interposed therebetween.

3. The bus bar according to claim 1, further comprising:
    a crimp portion that is configured to be crimped onto the insulation coating,
    wherein the positioning and holding portion includes:
    the crimp portion; and
    two wall portions that are respectively provided at two positions outside two ends of the crimp portion in a direction in which the electrical wire is routed, and are configured to hold the electrical wire in conjunction with the crimp portion.

4. The bus bar according to claim 1, further comprising:
    a crimp portion that is configured to be crimped onto the insulation coating,
    wherein the positioning and holding portion includes:
    the crimp portion; and
    two wall portions that are respectively provided at two positions outside two ends of the crimp portion in a direction in which the electrical wire is routed, so as to be orthogonal to the crimp portion, and are configured to hold the electrical wire at thick portions of the wall portions, in conjunction with the crimp portion.

5. The bus bar according to claim 1,
    wherein the positioning and holding portion is constituted by a bent protruding portion that is provided adjacent to the core wire connection portion,
    the bent protruding portion includes a top portion and routing walls that are respectively provided at two ends of the top portion in a direction in which the electrical wire is routed, and
    the routing walls are respectively provided with insertion holes that are configured to hold the electrical wire and into which the electrical wire is to be inserted.

6. The bus bar according to claim 1,
wherein the core wire connection portion includes a restriction portion that is configured to restrict the electrical wire from moving in the axial direction of the electrical wire.

7. The bus bar according to claim 1,
wherein the core wire connection portion includes a cutout portion against which a restriction jig is abutted, the restriction jig restricting the electrical wire from moving in the axial direction of the electrical wire.

8. The bus bar according to claim 1,
wherein the positioning and holding portion is provided in a central portion of the electrical wire connection portion in plan view, and
the electrical wire connection portion includes the core wire connection portion on each side of the positioning and holding portion.

9. A wiring module that is to be attached to a plurality of electricity storage elements each having a pair of electrode terminals composed of positive and negative electrode terminals, the wiring module comprising:
a bus bar according to claim 1;
an insulation protector that includes a bus bar holding portion that holds the bus bar; and
a detection electrical wire that is the electrical wire and is placed on the insulation protector to detect states of the electricity storage elements.

\* \* \* \* \*